United States Patent
Maegawa et al.

[19]

[11] Patent Number: 6,160,773
[45] Date of Patent: Dec. 12, 2000

[54] OPTICAL DISK DEVICE

[75] Inventors: Hiroshi Maegawa; Masahiko Nakayama, both of Kanagawa, Japan

[73] Assignee: Ricoh Company, Ltd., Tokyo, Japan

[21] Appl. No.: 09/158,501

[22] Filed: Sep. 23, 1998

[30] Foreign Application Priority Data

Sep. 25, 1997 [JP] Japan ................................. 9-278256

[51] Int. Cl.[7] .................................................... G11B 7/09
[52] U.S. Cl. .................................. 369/44.34; 369/44.28; 369/44.41
[58] Field of Search ............................ 369/44.34, 44.35, 369/44.27, 44.28, 44.29, 44.32, 44.41, 47, 54, 58, 60.01, 32

[56] References Cited

U.S. PATENT DOCUMENTS

| | | | |
|---|---|---|---|
| 5,073,880 | 12/1991 | Maeda et al. | 369/44.34 X |
| 5,777,963 | 7/1998 | Fueki et al. | 369/44.34 |
| 5,828,634 | 10/1998 | Ohno et al. | |
| 5,978,327 | 11/1999 | Kurada et al. | 369/44.34 X |

FOREIGN PATENT DOCUMENTS

| | | |
|---|---|---|
| 4-34212 | 6/1992 | Japan . |
| 8-31213 | 3/1996 | Japan . |
| 9-17029 | 1/1997 | Japan . |

*Primary Examiner*—Muhammad Edun
*Attorney, Agent, or Firm*—Dickstein Shapiro Morin & Oshinsky LLP

[57] ABSTRACT

An optical disk device performs tracking on a recordable optical disk which has an information recording track and a guiding track for guiding an optical beam to the information recording track, the guiding track having pre-pits including address information recorded therein. This device includes a photodetector which is divided into two divisions by a dividing line which is approximately optically parallel to the tangential line of the information recording track of the optical disk, and receives reflected light of the optical beam which is incident on the information recording track, and a tracking-error-signal generating portion having the respective outputs of the two divisions of the photodetector input thereto and generating a tracking error signal which is used for performing the tracking on the optical disk. The tracking-error-signal generating portion includes first and second holding portions holding local maximum values of the outputs of the two divisions of the photodetector, respectively, and a pre-pit-signal subtracting portion obtaining the differential signal of respective outputs of the first and second holding portions.

16 Claims, 9 Drawing Sheets

OPTICAL DISK DEVICE

BACKGROUND OF THE INVENTION

1. Field of the Invention

The present invention relates to a device for recording data on and reproducing data from an optical disk in which pre-pits are formed in guiding tracks, the pre-pits including address information. In particular, the present invention relates to a disk device in which an offset included in a tracking error signal is removed, and thereby, an optical beam can be controlled to be incident on a center of an information recording track of the disk accurately.

The present invention may be applied to a disk device for a high-density optical disk such as a DVD-R, an erasable type of the DVD-R, a DVD, or the like.

2. Description of the Related Art

In an optical disk device which can record data on an optical disk, in order to cause a light spot of an optical beam to follow an information recording track formed on the optical disk, a so-called push-pull tracking method is used in which a tracking error signal is obtained from a differential signal of a distribution of diffracted light from the guiding tracks.

In this push-pull tracking method, when an objective lens is moved by tracking control so as to cause the light spot to follow a decentering component of the disk, the diffracted light distribution on a photodetector moves. Due to the movement of the diffracted light distribution, an offset occurs in the tracking error signal.

Further, when the disk is sloped, respective light detection signals of the two divisions of the photodetector, the dividing line of which extends parallel to the tangential line of the information recording track of the disk, are not balanced. Thereby, the tracking error signal is not zero even when the light spot is present at the center of the information recording track. Thereby, track offset occurs.

Thus, it is not possible to position the light spot at the center of the information recording track with high accuracy.

In order to solve such a problem, for example, a pair of optical beams are incident on the optical disk at an interval of an odd-number of times of approximately ½ of the track pitch, a pair of beams reflected from the optical disk being incident on a pair of two-division photodetectors, respectively. The tracking error signal is obtained from the difference between the differences in the detection outputs of the respective two-division photodetectors. Such a method is disclosed, for example, as an optical-head tracking-error detecting method in Japanese Patent Publication No.4-34212.

According to this detecting method, it is possible to reduce the track offset.

Further, a method in which, in order to control the position of the optical beam at the center of the information recording track, the tracking error signal including the offset is corrected so that the offset is eliminated. Such a method is disclosed, for example, as an optical tracking method in Japanese Patent Publication No.3-31213.

In this optical tracking method, one or more sets of pre-wobbling tracking pits which are arranged to the right and left of a track are previously provided in a header area of the disk.

Then, when recording data on or reproducing data from the disk, using these pre-wobbling pits, the tracking error signal is obtained in accordance with a pre-wobbling method. The thus-obtained tracking error signal is a correct signal indicating the amount of light spot deviation from the center of the track and does not include the offset. Then, by using the thus-obtained tracking error signal, a push-pull tracking error signal obtained by using the distribution of the light diffracted from a pre-groove having a ⅛ wavelength depth is corrected.

In this optical tracking method, the light spot follows the track with high accuracy and data recording and reproducing can be performed.

An optical system of an optical disk device in the related art will now be described with reference to figures.

FIG. 1 shows a general view of the optical system of the optical disk device. The optical system includes a light source 1 of a laser or the like, a coupling lens 2, a beam splitter 3, a reflecting plate 4, a ¼-wavelength plate 5, an objective lens 6, a light-converging lens 8, a photodetector 9, and an I/V amplifier 10. The I/V amplifier 10 converts input signals of electric currents into signals of voltages and supplies the output A and the output B.

In the optical disk device shown in FIG. 1, an operation of generating the tracking error signal will now be described simply.

The light emitted from the light source 1 of a laser or the like, is converged on a recording surface 7a of an optical disk 7 through the coupling lens 2, beam splitter 3, reflecting plate 4, ¼-wavelength plate 5, and objective lens 6.

The light reflected by the recording surface 7a of the optical disk 7 returns to the same optical system, is reflected by the beam splitter 3, and is converged, through the light-converging lens 8, on the photodetector 9. Then, the light signal is converted into an electric signal through the photodetector 9.

Ordinarily, the output of the photodetector 9 is converted into voltages which will undergo various calculations. However, the outputs of the photodetector 9, which comprise electric currents, undergo various calculations as they are.

FIG. 2 is a perspective view showing a structure of the recording surface 7a of the optical disk 7. The recording surface 7a includes information recording tracks 11 (for example, referred to as grooves), the guiding tracks 12 (for example, referred to as lands) and the pre-pits 13.

As shown in FIG. 2, on the recording surface 7a, the information recording track 11 and the guiding track 12 for guiding the optical beam to the information recording track 11 are spirally formed. In the guiding tracks 12, the pre-pits 13 including address information are formed.

A dividing line 9a of the photodetector 9 shown in FIG. 1 is optically approximately parallel to the tangential line of the spiral tracks shown in FIG. 2.

Further, not shown in FIG. 1, a focus servo system for controlling the focal point of the light beam to the recording surface 7a is provided. In some devices, the photodetector 9 is further divided in order to detect the focal point. In the device in which the photodetector 9 is further divided, divisions obtained by the dividing line for dividing the photodetector 9 into the two divisions may be considered as groups, respectively.

As described above as the related art, in order to reduce the offset of the tracking error signal, the optical-head tracking-error detecting method has been proposed in the above-mentioned Japanese Patent Publication No.4-34212.

In this method, a special arrangement using three beams is used. For the detection, it is necessary to divide the light beam into three or more beams. Thereby, when a recording device in which it is difficult to obtain a sufficient intensity of light is used, the light intensity of each division beam may not be sufficient.

Further, in tracking performed on a two-layer optical disk, a pair of the beams adversely affects the main beam.

Further, the optical tracking method in which the tracking error signal including the offset is corrected so that the offset is eliminated has been proposed in Japanese Patent Publication No.8-31213.

In this method, from the pits arranged to the right and left of the track in the header area of the disk, an accurate amount of deviation from the center of the track, which does not include the offset, is detected, and thereby, the push-pull tracking error signal which is obtained by using the light diffracted from the pre-groove is corrected.

In the optical disk on which data can be written, it is necessary to previously record a synchronization signal and address information for searching for a position, as pits, on the optical disk (ordinarily, in the information recording track) at a stage of pre-formatting.

However, the pre-wobbling pits or the address-information pits have no relation to user data. A capacity which can be used for recording user data is reduced as a result of previously recording such pits. Thus, the use efficiency of the disk recording surface is degraded.

When an optical disk (for example, a DVD-R), data of which can be reproduced by a device which is a device only for data reproduction, is produced, it is necessary that data of the optical disk can be reproduced similarly to a case where data of a reproduction-only optical disk (for example, a DVD-ROM) having a special medium format is reproduced.

For this purpose, tracking pre-pits or address-information pits, which are not provided on a reproduction-only optical disk, cannot be formed on the information track of the non-reproduction-only optical disk, data of which can be reproduced by the device which is a device only for data reproduction.

In order to solve such a problem, the optical disk on which address information, which is necessary for the optical disk on which data can be recorded, can be recorded without reduction of recording capacity and without affecting data reproduction through the device for only reproduction has been proposed in Japanese Laid-Open Patent Application No.9-17029, 'Optical Disk, Reading Device therefor, and Optical-Disk Manufacturing Method'.

In this optical disk and this reading device therefor, a synchronization signal and address information to be used for a position search are not recorded in the information recording track but are recorded in the guiding tracks as pre-pits. The synchronization signal and address information are read through a system other than the system for processing the reproduction signal.

That is, in this optical disk, the pre-pit information including the address information is recorded in the guiding track which is used for guiding the optical beam.

At this time, the pre-pits are arranged so that the pre-pits are not adjacent to each other. Thus, a medium format of the optical disk medium is special.

In means for detecting the tracking error signal for the optical disk having such a format, the tracking error signal is detected by using a differential signal of signals obtained from two light-receiving elements obtained as a result of a photodetector being divided into the two divisions by the dividing line parallel to or perpendicular to the tracks.

SUMMARY OF THE INVENTION

An object of the present invention is to accurately correct the tracking error signal including the offset so as to eliminate the offset, which offset occurs in the push-pull tracking method for causing the light spot to follow the information recording track of the optical disk. This optical disk may be the optical disk in which the pre-pit information including the address information is recorded in the guiding track which is used for guiding the optical beam to the information recording track (disclosed in the above-mentioned Japanese Laid-Open Patent Application No. 9-17029). Alternately, this optical disk may be the disk in which the pits are previously arranged to the right and left of the track in the header area of the disk (disclosed in the above-mentioned Japanese Patent Publication No.8-31213).

An optical disk device, according to the present invention, which optical disk device performs tracking on a recordable optical disk which has an information recording track and a guiding track for guiding an optical beam to the information recording track, the guiding track having pre-pits including address information recorded therein, comprises:

a photodetector which is divided into two divisions by a dividing line which is approximately optically parallel to the tangential line of the information recording track of the optical disk, and receives reflected light of the optical beam which is incident on the information recording track; and a tracking-error-signal generating portion having the respective outputs of the two divisions of the photodetector input thereto and generating a tracking error signal which is used for performing the tracking on the optical disk, wherein the tracking-error-signal generating portion comprises:

first and second holding portions holding local maximum values of the outputs of the two divisions of the photodetector, respectively; and a pre-pit-signal subtracting portion obtaining the differential signal of respective outputs of the first and second holding portions.

The tracking-error-signal generating portion may further comprise:

a gate portion updating respective values of the first and second holding portions at a predetermined time interval; and a pre-pit-differential-signal low-frequency-band passing portion causing a low-frequency-band component of an output of the pre-pit-signal subtracting portion to pass therethrough.

In this arrangement, the signals from the pre-pits present in the guiding tracks at the two sides of the information recording track are obtained from the respective outputs from the two divisions of the photodetector which is divided into the two divisions by the dividing line approximately optically parallel to the tangential line of the information recording track. The thus-obtained signals are updated at the predetermined time interval, and the low-frequency-band component of the differential signal of these signals is used as the tracking error signal.

Thus, without using special pits for servo, by using the pre-pits present in the guiding track, it is possible to control the position of the optical beam to be maintained along the center of the information recording track, using the tracking error signal not including substantial offset, even when optical-axis deviation occurs.

The tracking-error-signal generating portion may further comprise:

a push-pull-signal subtracting portion obtaining the differential signal of the respective outputs of the two divisions of the photodetector;

a push-pull-differential-signal low-frequency-band passing portion which causes a low-frequency-band component of an output of the push-pull-signal subtracting portion to pass therethrough; and a correcting portion correcting an output of the push-pull-differential-signal low-frequency-band passing portion using an output of the pre-pit-differential-signal low-frequency-band passing portion.

In this arrangement, the push-pull signal is used as a main signal, and the main signal is corrected by using the signal obtained from the pre-pit information.

Accordingly, in addition to the above-mentioned advantage of the optical disk device of the previously described arrangement, it is possible to perform continuous tracking control using the push-pull signal as the main signal, and, also, it is possible to perform the control without being substantially affected by disturbance.

An optical disk device, according to another aspect of the present invention, which optical disk device performs tracking on a recordable optical disk which has an information recording track and a guiding track for guiding an optical beam to the information recording track, the guiding track having pre-pits including address information recorded therein, comprises:

a photodetector which is divided into two divisions by a dividing line which is approximately optically parallel to the tangential line of the information recording track of the optical disk, and receives reflected light of the optical beam which is incident on the information recording track; and a tracking-error-signal generating portion having the respective outputs of the two divisions of the photodetector input thereto and generating a tracking error signal which is used for performing the tracking on the optical disk, wherein the tracking-error-signal generating portion comprises:

a first subtracting portion obtaining the differential signal of respective outputs of the two divisions of the photodetector;

a first holding portion holding the absolute values of local maximum values of an output of the first subtracting portion;

a second holding portion holding the absolute values of local minimum values of the output of the first subtracting portion; and a second subtracting portion obtaining the differential signal of respective outputs of the first and second holding portions.

The tracking-error-signal generating portion may further comprise:

a gate portion updating respective values of the first and second holding portions at a predetermined time interval; and a pre-pit-differential-signal low-frequency-band passing portion causing a low-frequency-band component of an output of the second subtracting portion to pass therethrough.

In this arrangement, the signals from the pre-pits present in the guiding tracks at the two sides of the information recording track are obtained from the differential signal of the respective outputs of the two divisions of the photodetector which is divided into the two divisions by the dividing line approximately optically parallel to the tangential line of the information recording track. The thus-obtained signals are updated at the predetermined interval, and the low-frequency-band component of the differential signal of these signals is used as the tracking error signal.

Thus, without using special pits for servo, by using the pre-pits present in the guiding tracks, it is possible to control the position of the optical beam to be maintained along the center of the information recording track, using the tracking error signal not including substantial offset, even when optical-axis deviation occurs.

The tracking-error-signal generating portion may further comprise:

a third subtracting portion obtaining the differential signal of the respective outputs of the two divisions of the photodetector;

a push-pull-differential-signal low-frequency-band passing portion which causes a low-frequency-band component of an output of the third subtracting portion to pass therethrough; and a correcting portion correcting an output of the push-pull-differential-signal low-frequency-band passing portion using an output of the pre-pit-differential-signal low-frequency-band passing portion.

In this arrangement, the push-pull signal is used as a main signal, and the main signal is corrected by using the signal obtained from the pre-pit information.

Accordingly, in addition to the above-mentioned advantage of the optical disk device of the previously described arrangement, it is possible to perform continuous tracking control using the push-pull signal as the main signal, and also, it is possible to perform the control without being substantially affected by disturbance.

The tracking-error-signal generating portion may further comprise:

an offset adding portion adding a predetermined amount of offset to an output of the correcting portion; and a switching portion switching the predetermined amount of offset of the offset adding portion between an amount for a case where information is written in a not-yet-recorded area and an amount for a case where information is rewritten in an already-recorded area.

In this arrangement, the amount of offset to be added to the tracking error signal is switched between the amount for the case where information is recorded in a not-yet-recorded area and the amount for the case where information is recorded (rewritten) in an already-recorded area.

Thereby, it is possible to cancel the offset included in the tracking error signal, which offset occurs due to light reflected from a mark series previously recorded in the information recording track on only one side of the information recording track in which information is currently recorded.

Each of the first and second holding portions may comprise a peak holding circuit, an A-D converter, a register and a D-A converter.

In this arrangement, each holding portion which holds the maximum value of each pre-pit signal includes the peak holding circuit, A-D converter, register and D-A converter.

Thereby, it is possible to generate an accurate tracking error signal not including an error due to discharge (leakage in a capacitor) in the peak holding circuit or the like.

The gate portion may comprise:

a binary-digital-signal generating portion digitizing respective outputs of the two divisions of the photodetector into binary digital signals, using a predetermined level as a reference level; and a delaying portion delaying the output signals of the binary-digital-signal generating portion for a predetermined time period.

In this arrangement, when the timing signals for holding the maximum values of the pre-pit signals are generated, the output signals of the photodetector are digitized into binary digital signals by using the predetermined voltage level, and then, the binary digital signals are delayed for the predetermined time period.

Thereby, it is possible to generate the timing signals, using a simple circuit arrangement, for enabling holding of the maximum values of the pre-pit signals of the pre-pits which are arranged in the guiding track on the two sides, where the timings of occurrences (detection) of the pre-pits cannot be predicted.

Alternatively, the gate portion may comprise:

a binary-digital-signal generating portion digitizing respective outputs of the two divisions of the photodetector into binary digital signals, using a predetermined level as a reference level;

a logical-product outputting portion outputting the logical products of recording data and the respective output signals of the binary-digital-signal generating portion; and a delaying portion delaying the respective outputs of the logical-product outputting portion for a predetermined time period.

In this arrangement, when the timing signals for holding the maximum values of the pre-pit signals are generated, the logical products of the recording data and the delayed signals of the binary digital signals of the output signals of the photodetector are obtained. Thereby, when information is being recorded in the information recording track, the pre-pits on the adjacent guiding tracks can be detected.

Alternatively, the gate portion may comprise:

a binary-digital-signal generating portion digitizing each of the outputs of the two divisions of the photodetector into a binary digital signal, using a predetermined level as a reference level;

an enabling-signal outputting portion outputting an enabling signal which rises after a first predetermined time period has elapsed from each rising edge of the output of the binary-digital-signal generating portion, and decays after a second predetermined time period has elapsed since the enabling signal rose;

a logical-product outputting portion outputting logical products of the output of the binary-digital-signal generating portion and the output of the enabling-signal outputting portion; and a delaying portion delaying the output of the logical-product outputting portion for a third predetermined time period.

In this arrangement, when the timing signal for holding the maximum value of each pre-pit signal is generated, each output signal of the photodetector is digitized into the binary digital signal by using the predetermined level as the reference level, the enabling signal has a high level for the second predetermined time period after the first predetermined time period has elapsed from each rising edge of the binary digital signal, the logical product of the binary digital signal and the enabling signal is output, and the logical-product output is delayed for the third predetermined time period.

Thereby, for the pre-pit(s) of the successively arranged plurality of pre-pits, the interval between each pair of successive pre-pits of the plurality of pre-pits being predetermined, although timings of occurrences (detection) of the plurality of pre-pits cannot be predicted, it is possible to generate an accurate timing signal.

Other objects and further features of the present invention will become more apparent from the following detailed description when read in conjunction with the accompanying drawings.

DETAILED DESCRIPTION OF THE PREFERRED EMBODIMENTS

In an optical disk device according to the present invention, particularly, a tracking-error-signal generating portion is improved. Without affecting a data series present in the information recording track, based on signals such as the synchronization signal, address information and so forth recorded in the guiding track, as a result of detecting an amount of light-spot position deviation from the center of the information recording track, without the offset being included in the tracking error signal, it is possible to perform control for accurate positioning of the optical beam along the center of the information recording track.

A first embodiment of the present invention will now be described.

In the first embodiment, signals from the pre-pits present in the guiding tracks at the two sides of the information recording are extracted from the outputs of the two divisions of the photodetector, respectively. The thus-obtained signals from the pre-pits are updated at a predetermined time interval, and a low-frequency-band component of the differential signal of these two signals is used as the tracking error signal.

Hardware of the first embodiment will now be described.

Figure 3:
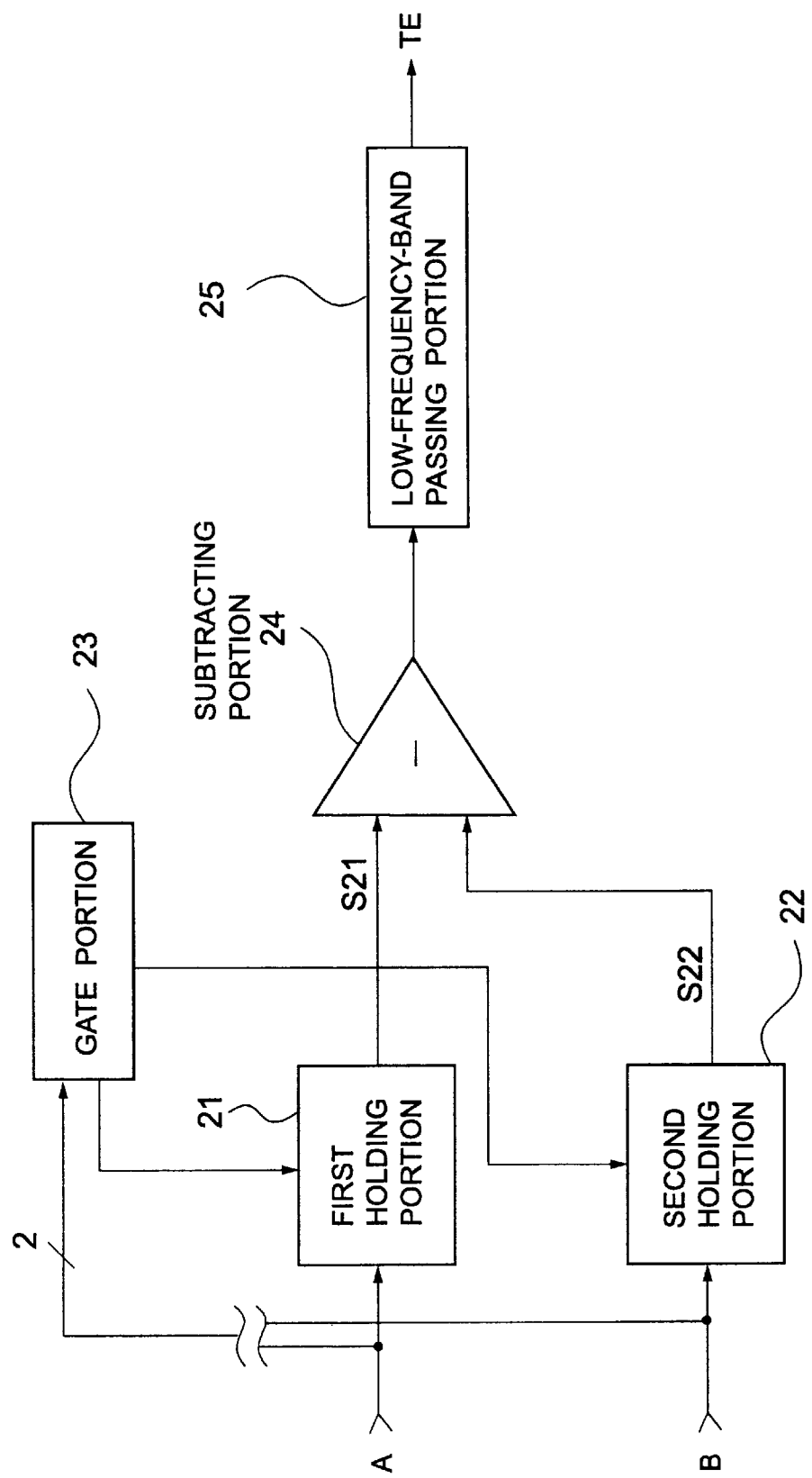
FIG. 3 is a functional block diagram showing an example of a tracking-error-signal generating portion of an optical disk device in a first embodiment of the present invention.

FIG. 3 is a functional block diagram showing an example of a tracking-error-signal generating portion of an optical disk device in the first embodiment of the present invention. The arrangement shown in FIG. 3 includes a first holding portion 21, a second holding portion 22, a gate portion 23, a subtracting portion 24, and a low-frequency-band passing portion 25. The low-frequency-band passing portion 25 outputs the tracking error signal TE. The first holding portion 21 outputs a signal S21, and the second holding portion 22 outputs a signal S22.

Figure 1:
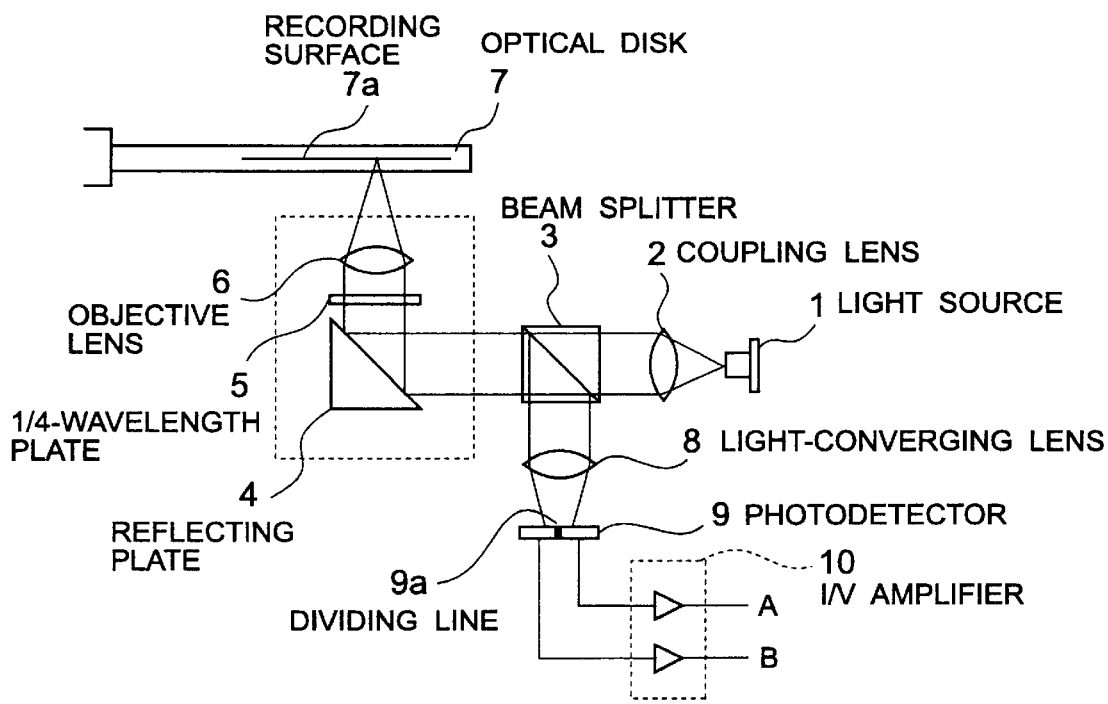
FIG. 1 shows a general arrangement of an optical system of an optical disk device in the related art.

The photodetector 9 shown in FIG. 1 is divided by the dividing line 9a which is optically approximately parallel to the tangential line of the information recording track. The outputs of the thus-obtained two divisions of the photodetector 9 become the output A and output B through the I/V amplifier 10 shown in FIG. 1. The output A and output B are the signal A and the signal B shown in FIG. 3.

The first and second holding portions 21 and 22 hold the local maximum values of the two signals A and B for a predetermined time period, respectively.

The gate portion 24 updates the values held by the first and second holding portions 21 and 22 at a predetermined time interval.

The subtracting portion 24 obtains the differential signal of the two outputs of the first and second holding portions 21 and 22.

The low-frequency-band passing portion 25 causes a low-frequency-band component of the output of the subtracting portion 24 to pass therethrough.

The tracking-error-signal generating portion in the first embodiment has the above-described arrangement.

Operation thereof will now be described.

The signals A and B are obtained as a result of the outputs of the photodetector 9 shown in FIG. 1 being input to the I/V amplifier 10 and then output from the I/V amplifier 10. The signals A and B are input to the first and second holding portions 21 and 22, and the gate portion 23.

Then, the signal S21 is output from the first holding portion 21, the signal S22 is output from the second holding portion 22, and the difference (S21–S22) of the signals S21 and S22 is detected by the subtracting portion 24.

The tracking error signal TE is generated as a result of a low-frequency-band component of the output of the subtracting portion 24 being caused to pass through the low-frequency-band passing portion 25.

The gate portion 23 controls the holding timing of the first and second holding portions 21 and 22.

With reference to a timing chart shown in FIG. 4, an operation of generating the tracking error signal TE in the optical disk device shown in FIG. 3 will now be described.

Figure 2:
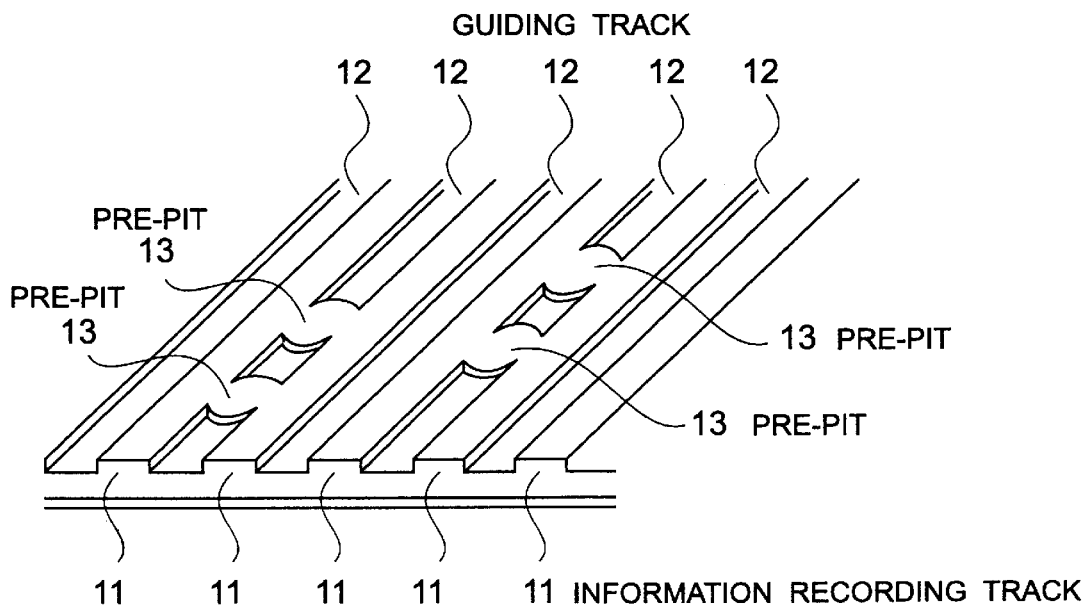
FIG. 2 shows a perspective view of a recording surface of a medium (optical disk)
Figure 4:
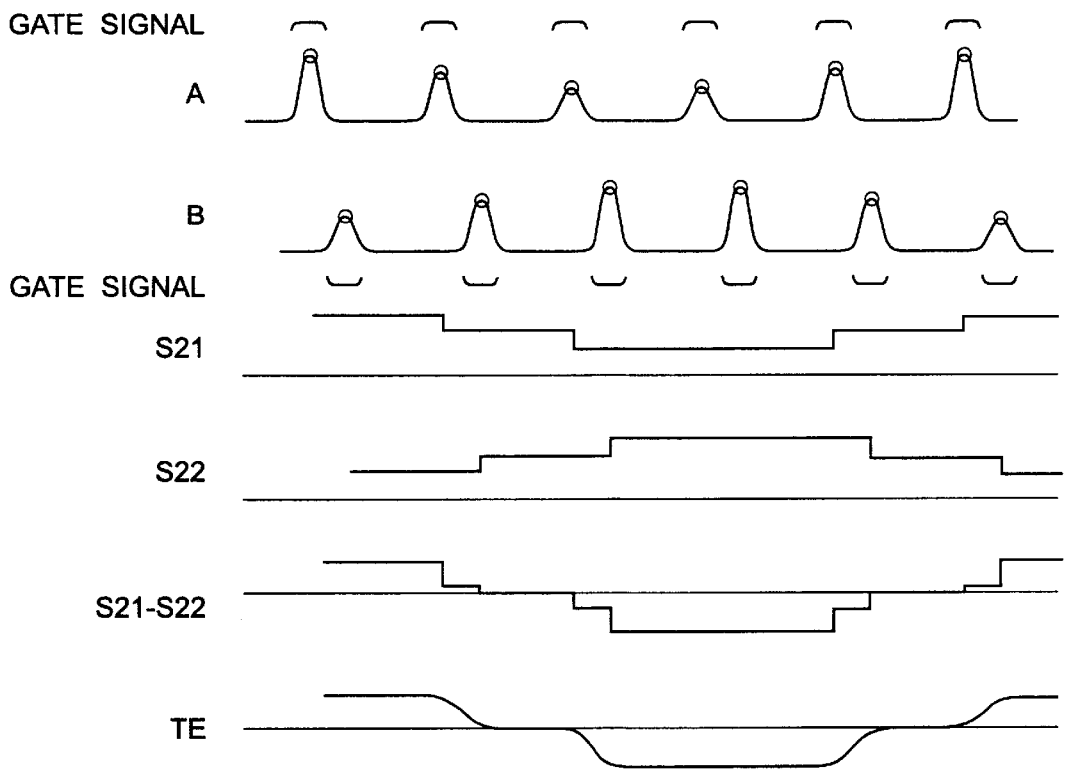
FIG. 4 shows a timing chart for describing an operation of the tracking-error-signal generating portion shown in FIG. 3, and shows a relationship between the timing chart and an optical-beam passing route.
Figure 4:
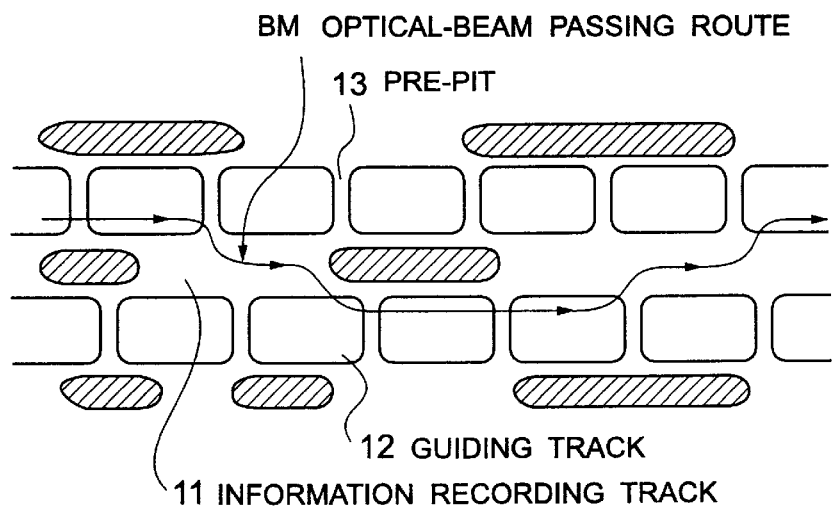

FIG. 4 shows the timing chart for describing the operation of the tracking-error-signal generating portion shown in FIG. 3, and shows a relationship between the timing chart and the optical-beam passing route. The reference numerals and reference letters shown in FIG. 4 correspond to those shown in FIGS. 2 and 3, respectively. The light spot of the optical beam moves on the recording surface 7a as shown in FIG. 4 as the optical-beam passing route BM. The sampled values of the signals A and B are indicated by the mark ○.

When the light spot of the optical beam deviates from the center of the information recording track 11, as shown in FIG. 4, the local maximum values (appearing as peaks) of the signals from the pre-pits present in the guiding tracks 12 change.

The timings (positions) of the pre-pit signals (of the pre-pits present in the guiding tracks 12 at the two sides of the information recording track 11) detected as the output signals A and B of the I/V amplifier 10 are preferable to be shifted from one another.

For the output signals A and B of the I/V amplifier 10, the first and second holding portions 21 and 22 sample the local maximum values of these signals A and B at the predetermined timings, and hold them for the predetermined time period so as to outputs the signals S21 and S22.

Each of the predetermined timings is a timing at which the light spot of the optical beam passes the position of the pre-pit. The predetermined time period is a time period until the timing at which the light spot of the optical beam passes the position of the subsequent pre-pit.

Specifically, the time period for holding the signal by the holding portion 21 or 22 is a time period during which the gate signal output from the gate portion 23 is in a dis-enable condition. When the gate signal is in an enable condition, the holding portion 21 or 22 samples the local maximum value.

Details will be described in descriptions of sixth and seventh embodiments. In FIG. 4, the mark ○ put on each of the output signals A and B of the I/V amplifier indicates the sampled values, and output pulses of the gate signals shown above the signal A and below the signal B indicate the enable conditions. The holding portion 21 or 22 samples the local maximum values of the signals A or B, respectively, during the periods of these output pulses of the gate signal. During the periods other than the periods of the output pulses, the holding portion 21 or 22 holds the sampled values, respectively.

The signals S21 and S22 output from the first and second holding portions 21 and 22, respectively, are input to the subtracting portion 24 which generates the differential signal (S21–S22), and the low-frequency-band component of the differential signal is obtained through the low-frequency-band passing portion 25. Thus, the tracking error signal TE is generated.

Thus, in the first embodiment, the signals from the pre-pits present in the guiding tracks at the two sides of the information recording track are obtained from the outputs A and B from the two divisions of the photodetector which is divided into the two divisions by the dividing line approximately optically parallel to the tangential line of the information recording track. The thus-obtained signals are updated at the predetermined interval, and the low-frequency-band component of the differential signal of these signals is used as the tracking error signal.

Thus, without using special pits for servo, by using the pre-pits present in the guiding track, it is possible to control the position of the optical beam to be maintained along the center of the information recording track, using the tracking error signal not including a substantial offset, even when optical-axis deviation occurs.

A second embodiment of the present invention will now be described.

In the second embodiment of the present invention, a push-pull signal obtained from the tracking-error-signal generating portion is used as a main signal, and this main signal is corrected by using the output of the low-frequency-band passing portion (25 in FIG. 3) of the tracking-error-signal generating portion, that is, the signal obtained from the pre-pit information.

Figure 5:
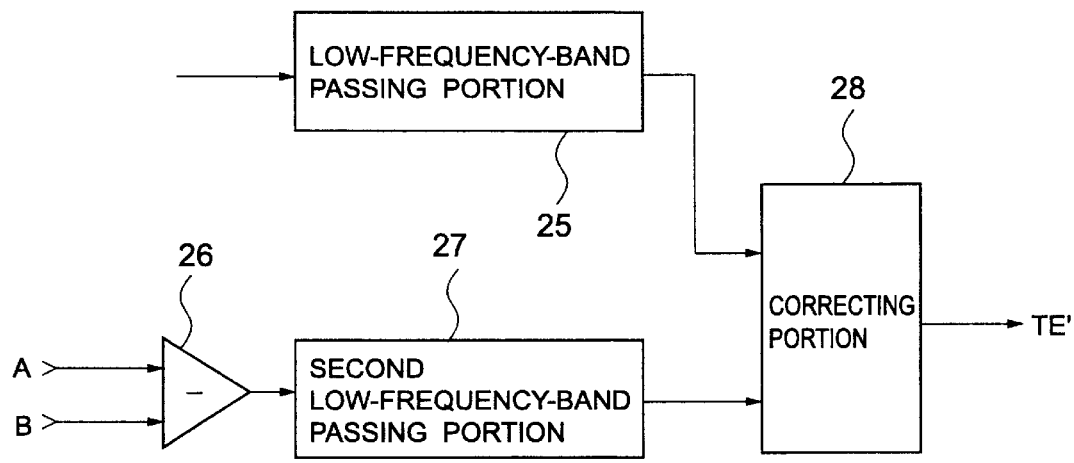
FIG. 5 is a functional block diagram of part of a tracking-error-signal generating portion in an optical disk device in a second embodiment of the present invention.

FIG. 5 is a functional block diagram of part of a tracking-error-signal generating portion in an optical disk device in the second embodiment. The reference numeral and reference letters in FIG. 5 are the same as those in FIG. 3. The arrangement shown in FIG. 5 includes a second subtracting portion 26, a second low-frequency-band passing portion 27 and a correcting portion 28. The correcting portion 28 outputs a corrected tracking error signal TE'.

In the tracking-error-signal generating portion shown in FIG. 3, the tracking error signal TE is the output of the low-frequency-band passing portion 25.

In the arrangement shown in FIG. 5, by using the output (the tracking error signal TE) of the low-frequency-band passing portion 25, the tracking error signal (the main signal) obtained from the second low-frequency-band passing portion 27 is corrected. Thus, the tracking error signal obtained from the second low-frequency-band passing portion including the offset is corrected so that the offset is eliminated, and, thus, the tracking error signal TE' which is actually used is obtained.

In FIG. 5, as in FIG. 3, the signals A and B are the signals A and B output from the I/V amplifier 10 shown in FIG. 1.

In the tracking-error-signal generating portion shown in FIG. 5, the output of the second subtracting portion 26 is input to the second low-frequency-band passing portion 27, through which only a low-frequency-band component of the output of the second subtracting portion 26 is obtained.

Ordinarily, the output (the main tracking error signal) of the second low-frequency-band passing portion is the push-pull signal.

Therefore, the output of the second low-frequency-band passing portion 27 may include the offset occurring due to the optical-axis deviation.

In order to eliminate this offset, an auxiliary signal is provided externally.

For example, the output (tracking error signal TE) of the low-frequency-band passing portion 25 shown in FIG. 3 is used as the auxiliary signal.

The correcting portion 28 may comprise ordinary adding and subtracting portions. However, it is also possible to perform correction in two steps.

That is, when the output of the low-frequency-band passing portion 25 exceeds a predetermined value, a predetermined correction may be performed on the main signal. Thus, simple correction in two steps may be performed.

Thus, in the second embodiment, the push-pull signal is used as the main signal, and the main signal is corrected by using the signal obtained from the pre-pit information.

Accordingly, in addition to the above-mentioned advantage of the optical disk device in the first embodiment, it is possible to perform continuous tracking control using the push-pull signal as the main signal, and also, it is possible to perform the control without being substantially affected by disturbance.

A third embodiment of the present invention will now be described.

In the third embodiment, the signals from the pre-pits present in the guiding tracks at the two sides of the information recording track are obtained from the differential signal of the outputs of the two divisions of the photodetector which is divided into the two divisions, the signals are updated at a predetermined time interval, the differential signal of these signals is obtained, and the low-frequency-band component of this differential signal is used as the tracking error signal.

First, the absolute values of the local maximum value and the local minimum value of the differential signal of the outputs of the two divisions of the photodetector which is divided into the two division are obtained, are updated at a predetermined time interval, and the low-frequency-band component of the differential signal of the absolute values of the local maximum value and the local minimum value is used as the tracking error signal.

Figure 6:
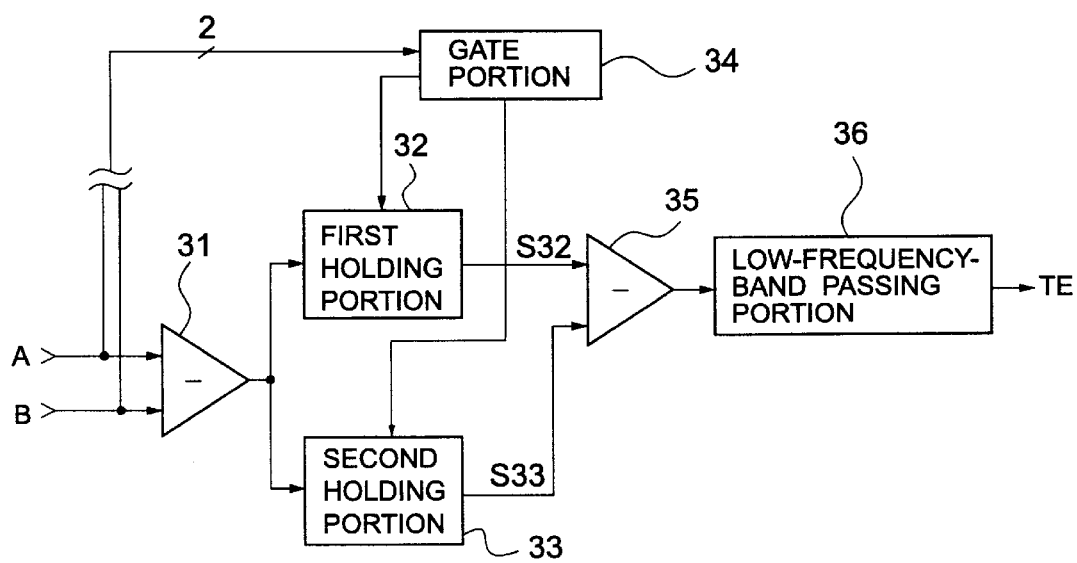
FIG. 6 is a functional block diagram showing an example of a tracking-error-signal generating portion of an optical disk device in a third embodiment of the present invention.

FIG. 6 is a functional block diagram showing an example of a tracking-error-signal generating portion of an optical disk device in the third embodiment of the present invention. The arrangement of FIG. 6 includes a first subtracting portion 31, a first holding portion 32, a second holding portion 33, a gate portion 34, a second subtracting portion 35 and a low-frequency-band passing portion 36. The first holding portion 32 outputs a signal S32 and the second holding portion 32 outputs a signal S33.

The first subtracting portion obtains the differential signal of the respective outputs of the two divisions of the photodetector which is divided into the two divisions. The first holding portion 32 holds the absolute values of the local maximum values of the output of the first subtracting portion 31. The second holding portion 33 holds the absolute values of the local minimum values of the output of the first subtracting portion 31.

The gate portion 34 updates the values of the first and second holding portions 32 and 33 at a predetermined time interval.

The second subtracting portion 35 obtains the differential signal of the outputs of the first and second holding portions 32 and 33.

The low-frequency-band passing portion 36 causes a low-frequency-band component of the output of the second subtracting portion 35 to pass therethrough.

Figure 7:
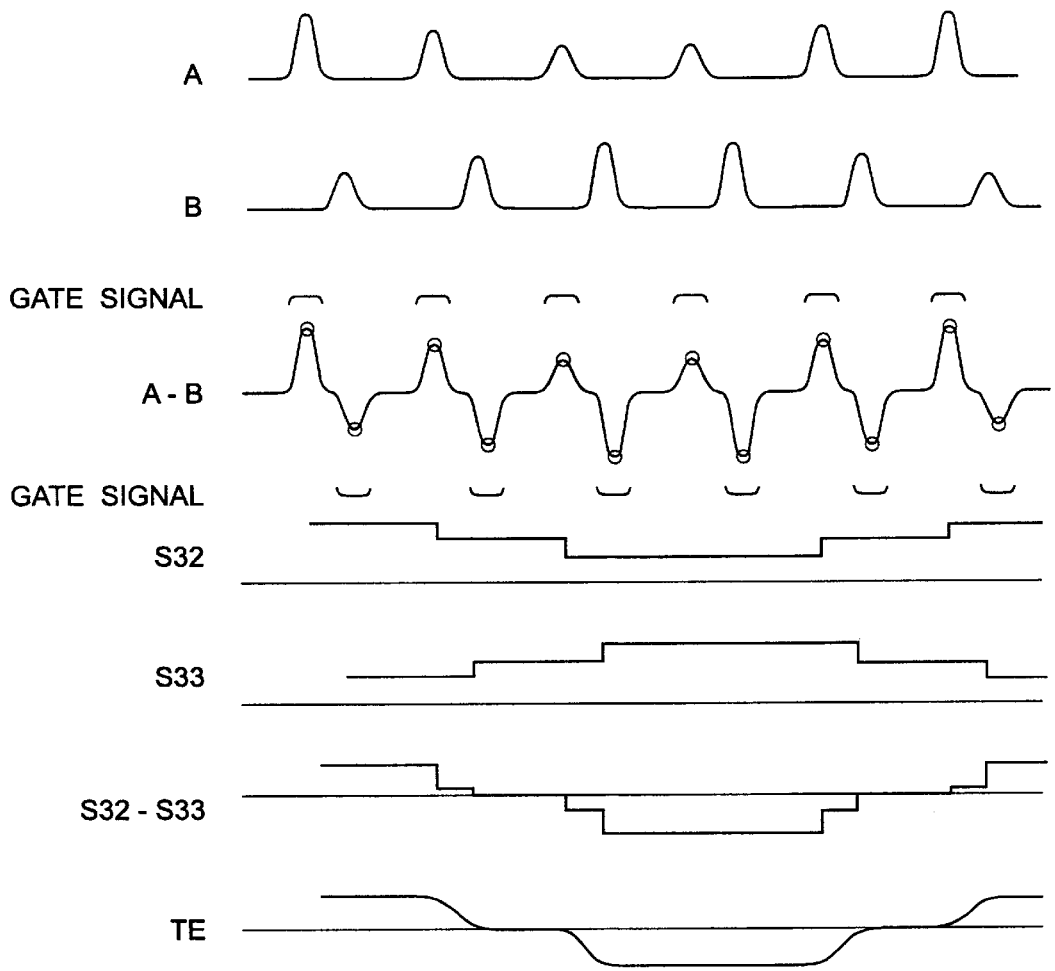
FIG. 7 shows a timing chart for describing an operation of the tracking-error-signal generating portion shown in FIG. 6.

FIG. 7 shows a timing chart for describing the operation of the tracking-error-signal generating portion shown in FIG. 6. The reference letters shown in FIG. 7 correspond to the reference letters shown in FIG. 6, respectively. The sampled values are indicated by the mark ◯.

Also in the tracking-error-signal generating portion shown in FIG. 6, similar to the case of the tracking-error-signal generating portion shown in FIG. 3, the signals A and B input to the first subtracting portion 31 are the signals A and B output from the I/V amplifier 10 shown in FIG. 1.

In the tracking-error-signal generating portion shown in FIG. 6, the first subtracting portion 31 generates the differential signal (A−B) and outputs the differential signal to the first and second holding portions 32 and 33.

At this time, the first holding portion 32 samples the absolute values of the local maximum values of the differential signal (A−B) at predetermined timings, and holds the sampled values for predetermined time periods, respectively (S32).

The second holding portion 33 samples the absolute values of the local minimum values of the differential signal (A−B) at predetermined timings, and holds the sampled values for predetermined time periods, respectively (S33).

The predetermined time periods are time periods during which the gate signal output from the gate portion 34 is in the dis-enable condition, respectively. Each time when the gate signal is in the enable condition, the first or second holding portion 32 or 33 samples the absolute value of the local maximum value or the local minimum value of the differential signal (A–B).

The predetermined timings are the timings at which the light spot of the optical beam passes the positions of the pre-pits, respectively.

Although the optical-beam passing route is not shown in FIG. 7, the optical-beam passing route is the same as that shown in FIG. 4. The pulses of the gate signals shown in FIG. 7 indicate the timings of the enable condition of the gate signals. The holding portion 32 or 33 samples the absolute value of the local maximum value or the local minimum value at each of the timings of the enable condition of the gate signals, and holds the thus-sampled values for the time periods other than the timings of the enable condition of the gate signals.

The signals S32 and S33 output from the first and second holding portions 32 and 33, respectively, are input to the second subtracting portion 35, which then generates the differential signal (S32–S33). Then, only a low-frequency-band component of the differential signal is obtained through the low-frequency-band passing portion 36. Thus, the tracking error signal TE is obtained.

Using the tracking error signal TE obtained from the low-frequency-band passing portion 36, it is possible to correct the tracking error signal TE obtained from the second low-frequency-band passing portion 27 described in the description of the second embodiment (shown in FIG. 5), so as to eliminate the offset included in this tracking error signal TE.

Specifically, instead of using the signal including only the low-frequency-band component obtained from the low-frequency-band passing portion 36 shown in FIG. 6 as the tracking error signal TE to be actually used, the signal including only the low-frequency-band component obtained from the second low-frequency-band passing portion 27 shown in FIG. 5 is used as the tracking error signal to be actually used (main signal). The signal obtained from the low-frequency-band passing portion 36 shown in FIG. 6 is input to the correcting portion 28 as a correction signal for correcting the tracking error signal, obtained from the second low-frequency-band passing portion 27, including the offset, so as to eliminate the offset. Thus, the tracking error signal TE' to be actually used is obtained.

Thus, the push-pull signal output from the second low-frequency-band passing portion 27 shown in FIG. 5 is used as the main signal, and the main signal is corrected by using the signal from the pre-pit information through the tracking-error-signal generating portion shown in FIG. 6.

Thereby, it is possible to perform continuous tracking control using the push-pull signal as the main signal, and, also, it is possible to perform the control without being substantially affected by disturbance.

The optical-axis deviation occurring for the information recording track of the optical disk in a general optical disk device will now be described. Such an optical-axis deviation is well-known.

Figure 8:
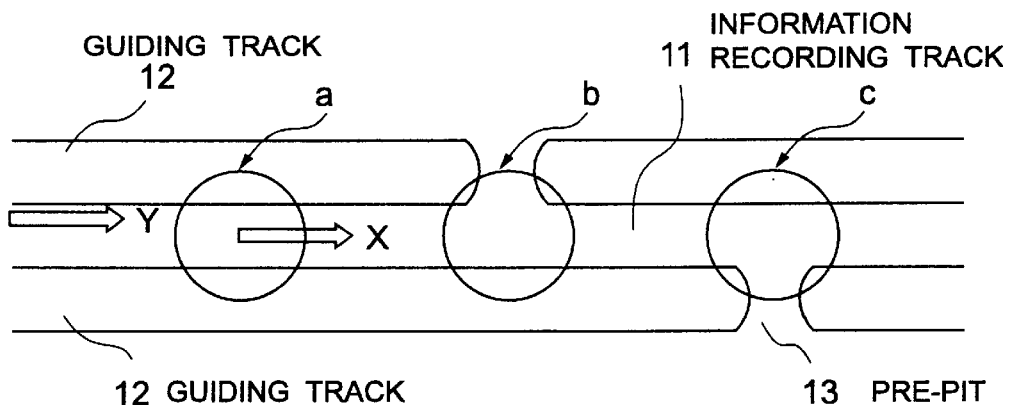
FIGS. 8A, 8B and 8C show a concept for describing optical-axis deviation on an optical disk.
Figure 8:
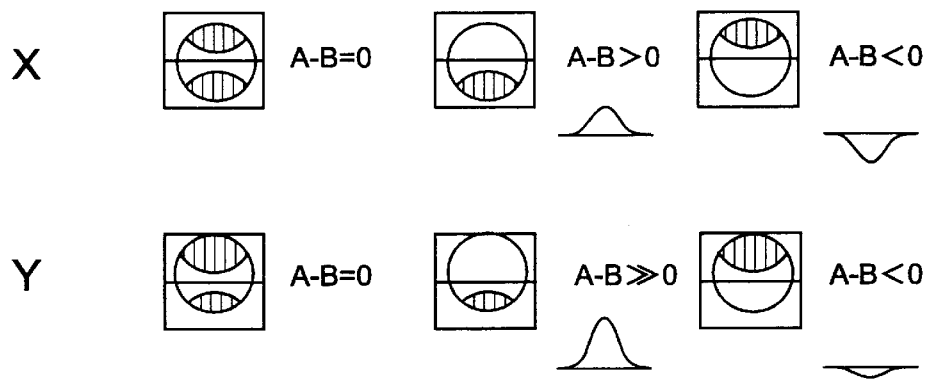
Figure 8:
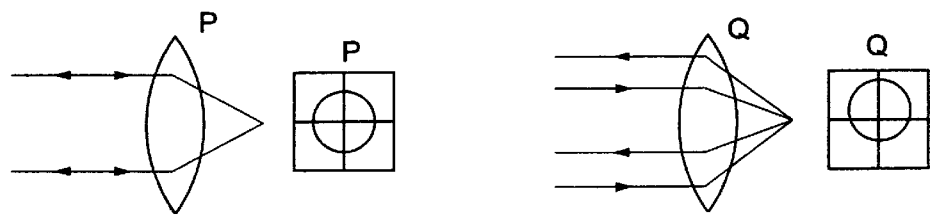

FIGS. 8A, 8B and 8C show a concept for describing the optical-axis deviation on the optical disk. FIG. 8A shows a condition of the information recording track and the optical-beam passing route. FIG. 8B shows the detection outputs of the respective divisions of the two-division photodetector. FIG. 8C shows a light path change due to the relation between the lens center and the luminous-flux center. The reference numerals shown in FIG. 8A are the same as those shown in FIG. 2. With reference to FIG. 8A, the light spot of the optical beam moves from the position 'a', to the position 'b', and, then, to the position 'c'. When the optical beam moves along the center of the information recording track 11, the optical-beam passing route is indicated by the arrow X. When the optical beam moves along a position slightly shifted from the center of the information recording track 11, the optical-beam passing route is indicated by the arrow Y, in FIG. 8A.

FIG. 8A shows an example of a condition where the optical beam moves along the information recording track of the optical disk.

In this case, in the guiding tracks 12, the two pre-pits 13 are present in the direction in which the optical beam moves (the direction of the arrows X and Y).

Specifically, the positions of the light spots 'b' and 'c' correspond to the positions of these pre-pits 13, respectively.

FIG. 8B shows distributions of light-beam intensity on the two-division photodetector, for the respective positions of the light spots 'a', 'b' and 'c', for the respective cases of the optical-beam routes X and Y.

For example, when the optical beam moves along the center of the information recording track 11, and the position of the light spot is the position 'a', the distribution of the light-beam intensity on the two-division photodetector is that shown in X of FIG. 8B, just below the position 'a' of FIG. 8A.

In the condition shown in X of FIG. 8B for the light spot 'a', no pre-pit 13 is present in the guiding track 12. Accordingly, the detection signals A and B are the signals obtained in the same condition. As a result of the light diffraction from the information recording track 11 of the optical disk being symmetrical, the differential signal (push-pull signal) is as follows:

$$A-B=0$$

Then, when the position of the light spot is the position 'b' in FIG. 8A, the pre-pit 13 is present only in the left-side (of the moving direction X, the upper-side in the figure) guiding track 12. As a result, only the detection signal B (of the lower-side division of the photodetector in FIG. 8B) includes the influence of light diffraction.

In this case, the distribution of the light-beam intensity on the two-division photodetector is that shown in X of FIG. 8B, just below the position 'b' of FIG. 8A. As a result, the differential signal (push-pull signal) has a positive value as follows:

$$A-B>0$$

Then, when the position of the light spot is the position 'c' in FIG. 8A, the pre-pit 13 is present only in the right-side (of the moving direction X, the lower-side in the figure) guiding track 12. As a result, only the detection signal A (of the upper-side division of the photodetector in FIG. 8B) includes the influence of light diffraction.

In this case, the distribution of the light-beam intensity on the two-division photodetector is that shown in X of FIG. 8B, just below the position 'c' of FIG. 8A. As a result, the differential signal (push-pull signal) has a negative value as follows:

$$A-B<0$$

The detection signals A and B described above are those in the case where the optical beam moves along the center of the information recording track 11 (the route of the arrow X).

On the other hand, when the optical beam moves along a position slightly deviated from the center of the information recording track 11 (the route of the arrow Y), the distributions of the optical-beam intensity are those shown in Y of FIG. 8B.

The case where the light beam moves along the route Y is a case where the tracking control is performed only by using the push-pull signal and the optical-axis deviation occurs.

The condition in which the optical-axis deviation occurs is the condition in which, as indicated by Q of FIG. 8C, the luminous-flux center is deviated from the lens center. As a result, the forward path and the backward path of the light beam are different. When the luminous-flux center is coincident with the lens center, as indicated by P of FIG. 8C, the forward path and the backward path of the light beam are the same.

The dividing line of the two-division photodetector is set so that, when the luminous-flux center is coincident with the lens center, the center of the light spot on the photodetector is coincident with the center of the dividing line. Therefore, when the light beam moves in the route Y, as indicated by Q of FIG. 8C, the center of the light spot on the photodetector is deviated from the center of the dividing line of the photodetector.

As a result, in accordance with a servo algorithm in which the tracking control is performed such that the push-pull signal should be zero, it is determined that $$A-B=0$$

for the condition where the optical beam moves along the route Y when the optical-axis deviation occurs, as shown in Y of FIG. 8B, just below the light-spot position 'a' of FIG. 8A. On the other hand, in a condition where the optical beam moves along the route Y when the optical-axis deviation does not occur, because the light diffraction from the information recording track 11 of the optical disk is asymmetrical, the differential signal (push-pull signal) is as follows:

$$A-B<0$$

When the pre-pit 13 is present at the left side of the light-beam moving direction Y (the upper side in the figure) or the right side of the light-beam moving direction Y (the lower side in the figure), the difference (A−B) of the detection signals A and B is different from that in the case where the optical-beam passing route is X.

Therefore, in the condition where the pre-pit 13 is present in the guiding track 12 at one side (left side or right side), the detection signals A, B and the differential signal (A−B) are clearly different between the cases where the light beam moves in the routes X and Y. Accordingly, a deviation (track offset) of the light-beam passing route from the center of the information recording track, which cannot be detected from the push-pull signal, can be accurately detected from the signal obtained from the pre-pit information.

A fourth embodiment of the present invention will now be described.

In the fourth embodiment, an amount of offset to be added to the tracking error signal is switched between an amount for a case where information is recorded in a not-yet-recorded area and an amount for a case where information is recorded (rewritten) in an already-recorded area in the tracking-error-signal generating portion in each of the second and third embodiments.

The optical disks on which information is recorded are classified into ones of a write-once type and ones of an erasable type. On the optical disk of the write-once type, information can be recorded on the disk only once, while information can be rewritten many times on the optical disk of the erasable type.

In a case where information is first recorded in the optical disk of the write-once type or the erasable type (that is, information is recorded in the not-yet-recorded area), during information recording, information which has been recorded, one turn before, is present in an information recording track on only one side of the information recording track in which information is currently recorded.

In this case, although a guiding track is present between the information recording track in which information is currently recorded and the adjacent information recording tracks, light reflected by the adjacent information recording tracks is slightly received by the photodetector. Thereby, there is a difference between the outputs of the two divisions of the two-division photodetector.

On the other hand, when information is over-written on the optical disk of the erasable type (that is, information is recorded in the already-recorded area), recorded information is present in the information recording tracks on both sides of the information recording track in which information is recorded currently. Therefore, there is no difference between the outputs of the two divisions of the two-division photodetector.

In the fourth embodiment, in order to enable switching of an amount of offset to be added to the tracking error signal between an amount for the case where information is recorded in the not-yet-recorded area and an amount for the case where information is recorded (rewritten) in the already-recorded area, a portion (offset adding portion) for adding predetermined amounts of offset to the output of the tracking-error-signal generating portion and a portion (switching portion) for switching the amount of offset to be added to the tracking error signal between an amount for the case where information is recorded in the not-yet-recorded area and an amount for the case where information is recorded (rewritten) in the already-recorded area are provided.

Figure 9:
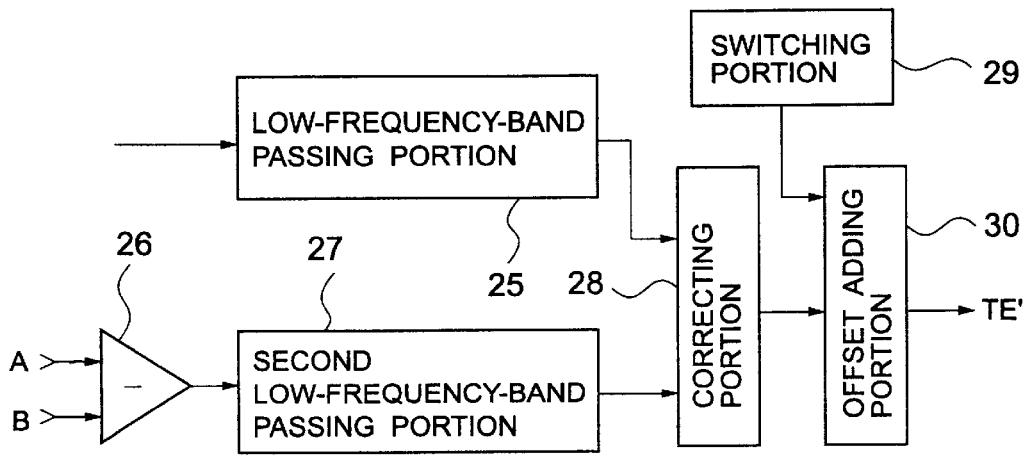
FIG. 9 shows a functional block diagram of part of a tracking-error-signal generating portion in an optical disk device in a fourth embodiment of the present invention.

FIG. 9 shows a functional block diagram of part of a tracking-error-signal generating portion in an optical disk device in the fourth embodiment. The reference numerals in FIG. 9 are the same as those in FIG. 5. The arrangement of FIG. 9 includes the switching portion 29 and the offset adding portion 30.

The tracking-error-signal generating portion in the fourth embodiment shown in FIG. 9 is obtained as a result of the switching portion 29 and the offset adding portion 30 being added to the tracking-error-signal generating portion in the second embodiment shown in FIG. 5.

In the tracking-error-signal generating portion in the fourth embodiment, the switching portion 29 detects whether a current information recording operation is an information recording operation in the case where information is recorded in the not-yet-recorded area or the case where information is recorded (rewritten) in the already-recorded area, and generates a switching signal. In response to the switching signal, the offset adding portion 30 adds a first predetermined amount of offset to the tracking error signal in the case where information is recorded in the not-yet-recorded area and adds a second predetermined amount of offset to the tracking error signal in the case where information is recorded (rewritten) in the already-recorded area.

Thus, in the fourth embodiment, an amount of offset to be added to the tracking error signal is switched between the amount for the case where information is recorded in the not-yet-recorded area and the amount for the case where information is recorded (rewritten) in the already-recorded area.

Thereby, it is possible to cancel the offset included in the tracking error signal, which offset occurs due to light reflected from a mark series previously recorded in the information recording track on only one side of the information recording track in which information is currently recorded.

Actually, in this case, the amount (the above-mentioned second predetermined amount) of offset to be added to the tracking error signal in the case where information is recorded in the already-recorded area is zero. In fact, as mentioned above, when information is over-written on the optical disk of the erasable type (that is, information is recorded in the already-recorded area), recorded information is present in the information recording tracks on both sides of the information recording track in which information is recorded currently. Therefore, there is no difference between the outputs of the two divisions of the two-division photodetector.

A fifth embodiment of the present invention will now be described.

In the fifth embodiment, the holding portion used in the tracking-error-signal generating portion in each of the first, second and third embodiments has a preferable specific arrangement.

Figure 10:
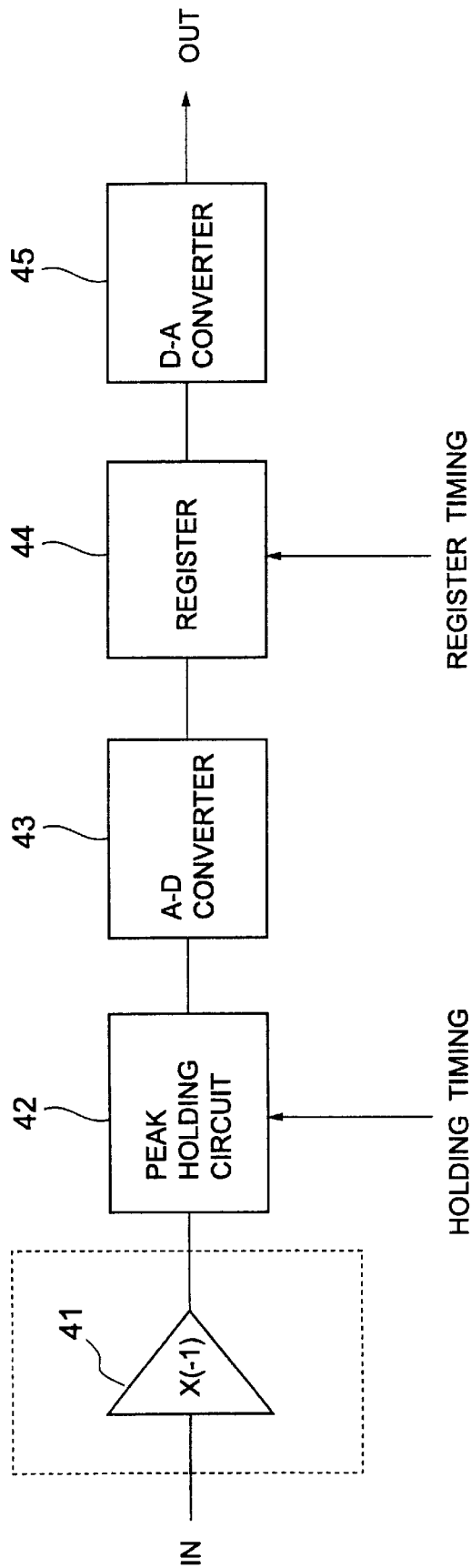
FIG. 10 shows a functional block diagram of one example of each holding portion used in an optical disk device in a fifth embodiment of the present invention.

Each of the first and second holding portions 21 and 22 shown in FIG. 3 and the first and second holding portions 32 and 33 shown in FIG. 6 has an arrangement shown in FIG. 10. FIG. 10 shows a functional block diagram of one example of each holding portion used in an optical disk device in the fifth embodiment. The arrangement shown in FIG. 10 includes an inverting amplifier 41, a peak holding circuit 42, an A-D converter, a register 44 and a D-A converter 45.

In FIG. 10, the holding portion includes the peak holding circuit 42, the A-D converter 43, the register 44 and the D-A converter 45.

The peak holding circuit 42 has a function of taking the local maximum values of an input signal instantaneously.

However, it is necessary to take the minimum value when the polarity of the input signal is minus in the case where the holding portion is the second holding portion 33 shown in FIG. 6.

In such a case, the peak holding circuit 42 has a function of taking the local minimum values of the input signal, or, by adding the inverting amplifier 41, the local minimum values of the input signal are changed into the local maximum values of the input signal through the inverting amplifier 41.

As the peak holding circuit 42 operates at a high speed, the time period for which the peak holding circuit 42 can hold an accurate value is short.

Therefore, a value taken by the peak holding circuit 42 is digitized by the A-D converter 43 and the register 44 stores this value as digital data.

The digital data stored in the register 44 is converted into an analog signal through the D-A converter 45 and is output as the output signal of the holding portion.

It is possible that data stored in the register 44 is in a form such that the data can be referred to by a CPU. It is also possible that data stored in the register 44 can be changed by the CPU.

By using the holding portion having the arrangement described above with reference to FIG. 10, the tracking-error-signal generating portion in each of the first, second, third and fourth embodiments can accurately hold the local maximum values/local minimum values of the input signal at desired timings.

With regard to a holding timing for the peak holding circuit 42 and a storing timing (register timing) for the register 44, a detailed description will be provided in below-mentioned descriptions of a sixth embodiment and a seventh embodiment, in conjunction with an operation of the gate portion.

In the fifth embodiment, the holding portion for holding the maximum value of the pre-pit signal includes the peak holding circuit, A-D converter, register and D-A converter.

Thereby, it is possible to generate an accurate tracking error signal not including an error due to discharge (leakage in a capacitor) in the peak holding circuit or the like.

A sixth embodiment of the present invention will now be described.

In the sixth embodiment, the gate portion used in the tracking-error-signal generating portion in each of the first, second and third embodiments has a preferable specific arrangement.

For example, as mentioned above, when the output signal A (or B) of the photodetector is input, the holding portion holds the local maximum values of the input signal. That is, when the pre-pit signal is input, the holding portion holds the maximum value of the pre-pit signal.

Then, when the subsequent pre-pit signal is input, the holding portion updates the held maximum value to the maximum value of the thus-input subsequent pre-pit signal.

The gate portion, that is, each of the gate portion 23 shown in FIG. 3 and the gate portion 34 shown in FIG. 6, generates a timing signal needed for such an operation of the holding portion.

Figure 11:
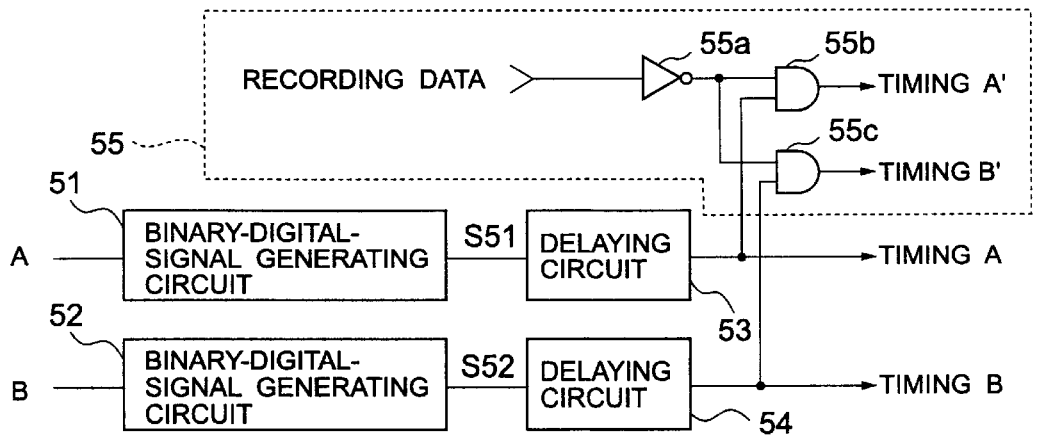
FIG. 11 shows a functional block diagram of an example of an arrangement of a gate portion used in an optical disk device in a sixth embodiment of the present invention.

Each of the gate portion 23 shown in FIG. 3 and the gate portion 34 shown in FIG. 6 has an arrangement shown in FIG. 11.

FIG. 11 shows a functional block diagram of an example of an arrangement of the gate portion used in an optical disk device in the sixth embodiment. The arrangement shown in FIG. 11 includes binary-digital-signal generating circuits 51, 52, delaying circuits 53, 54, and a logical-product outputting portion 55 which includes an inverter 55a and AND gate circuits 55b, 55c. The binary-digital-signal generating circuits 51 and 52 output signals S51 and S52, respectively.

Figure 12:
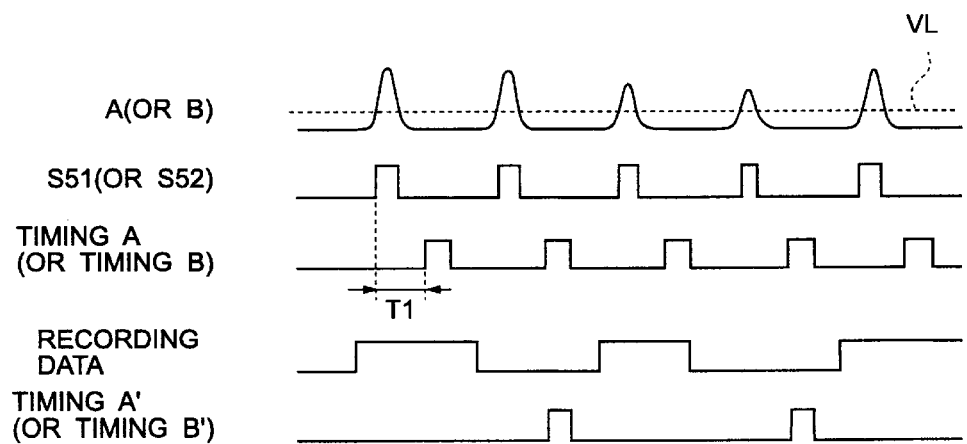
FIG. 12 shows a timing chart for describing an operation of the gate portion shown in FIG. 11.

In FIG. 11, the binary-digital-signal generating circuits 51 and 52 digitize the output signals A and B of the photodetector into binary digital signals S51 and S52, respectively, using a predetermined voltage level VL (as shown in FIG. 12). The delaying circuits 53 and 54 delay the output signals (S51 and S52) of the binary-digital-signal generating circuits 51 and 52, respectively, for a first predetermined time period T1 (as shown in FIG. 12).

The logical-product outputting portion 55 outputs the logical products of recording data and the outputs signals of the binary-digital-signal generating circuits 51, 52.

The logical-product outputting portion 55 includes the inverter 55a, to which the recording data is input, and the two AND gate circuits 55b and 55c.

The output signals A and B of the photodetector are processed basically in the same manner by the gate portion. Therefore, processing of only the output signal A of the photodetector will now be mainly described.

FIG. 12 shows a timing chart for describing the operation of the gate portion shown in FIG. 11.

As shown in FIG. 12, the input signal A (or B) is digitized into the binary digital signal S51 (or S52) by the binarydigital-signal generating circuit 51 (or 52). In the digitizing, the predetermined voltage level VL is used as a reference level. Thus, the binary-digital-signal generating circuit 51 (or 52) outputs the signal S51 (or S52).

The thus-output signal S51 (or S52) is delayed by the delaying circuit 53 (or 54) for the first predetermined time period T1, and, thus, a timing A (or timing B) signal is obtained.

It is preferable that the predetermined level VL be set to a voltage which sufficiently exceeds the noise voltage of the signal A (or B).

It is also preferable that the first predetermined time period T1 be set such that the time period T1 is longer than a time period required for the sampled local maximum value to become fixed in the peak holding circuit 42 in the holding portion, and is shorter than a time period after which a change in the sampled local maximum value occurs due to discharge in a capacitor or the like in the peak holding circuit 42.

Figure 13:
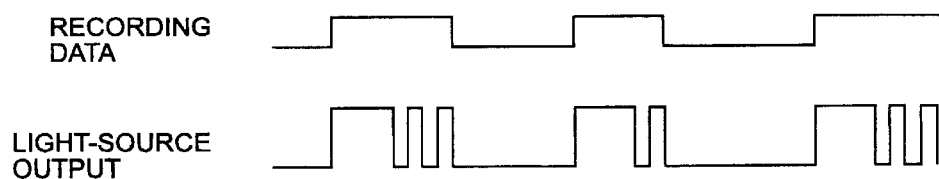
FIG. 13 shows a time chart for describing an optical-beam output in a recording operation.

FIG. 13 shows a time chart for describing an optical-beam output in a recording operation.

In the recording operation, as shown in FIG. 13, the output level of the light source is changed frequently in response to change in the level of the recording data. As a result, the intensity of the light reflected by the media at this time changes frequently.

Therefore, it is not possible to use the pre-pit signal obtained when the level of the recording data is high.

When a mark is formed on the optical disk in response to the recording data, strict mark-length control is required, and, for this purpose, a plurality of pulses are used for forming one mark. Accordingly, only when spaces are placed (that is, no marks are formed) on the optical disk, that is, when the level of the recording data is low, output values of the photodetector which are not affected by the pulses for forming the mark will be used.

Therefore, the logical products of the recording data and the timing A, B signals are generated by the logical-product outputting portion 55. Thus, timing signals A', B' are generated, the timing signals A', B' causing the holding portion to hold the pre-pit signals obtained when the light-source emits light in a fixed intensity, that is, when spaces are placed on the optical disk.

As mentioned above, each of the gate portion 23 shown in FIG. 3 and the gate portion 34 shown in FIG. 6 has the function of generating the timings needed for the operation of the holding portion. The gate portion provides, for example, the timing A, B signals needed for the operation of the holding portions such that, when the pre-pit signals of the output signals A, B of the photodetector are input, the holding portions hold the maximum values of the pre-pit signals, and, then, when the subsequent pre-pit signals are input, the holding portions update the held maximum levels to the maximum levels of the subsequent pre-pit signals, respectively.

When the gate portion shown in FIG. 11 is used for the fifth embodiment described with reference to FIG. 10, the holding timing shown in FIG. 10 to be input to the peak holding circuit 42 corresponds to each part of the timing A (or B) signal, the level of the timing A (or B) signal being high during the part of the timing A (or B) signal. Thus, the peak holding circuit 42 samples the value of the input signal during the time period during which the level of the timing A (or B) signal is low, and the peak holding circuit 42 holds the sampled value of the input signal during the time period during which the level of the timing A (or B) signal is high.

The register timings to be input to the register shown in FIG. 10 may be the timings of decaying edges of the timing A (or B) signal, respectively.

Thus, in the sixth embodiment, when the timing signals for holding the maximum values of the pre-pit signals are generated, the output signals of the photodetector are digitized into binary digital signals by using the predetermined voltage level, and then, the binary digital signals are delayed for the first predetermined time period. Thereby, it is possible to generate the timing signals, using a simple circuit arrangement, for enabling holding of the maximum values of the pre-pit signals of the pre-pits which are arranged in the guiding tracks on the two sides of the information recording track, where the timings of occurrences (detection) of the pre-pits cannot be predicted.

Further, when the timing signals for holding the maximum values of the pre-pit signals are generated, the logical products of the recording data and the delayed signals of the binary digital signals of the output signals of the photodetector are obtained. Thereby, when information is being recorded in the information recording track, the pre-pits on the adjacent guiding tracks can be detected.

A seventh embodiment of the present invention will now be described.

Also in the seventh embodiment, similar to the sixth embodiment, the gate portion used in the tracking-error-signal generating portion in each of the first, second and third embodiments has a preferable specific arrangement.

The seventh embodiment is advantageous when the plurality of pre-pits are arranged at a predetermined interval.

Figure 14:
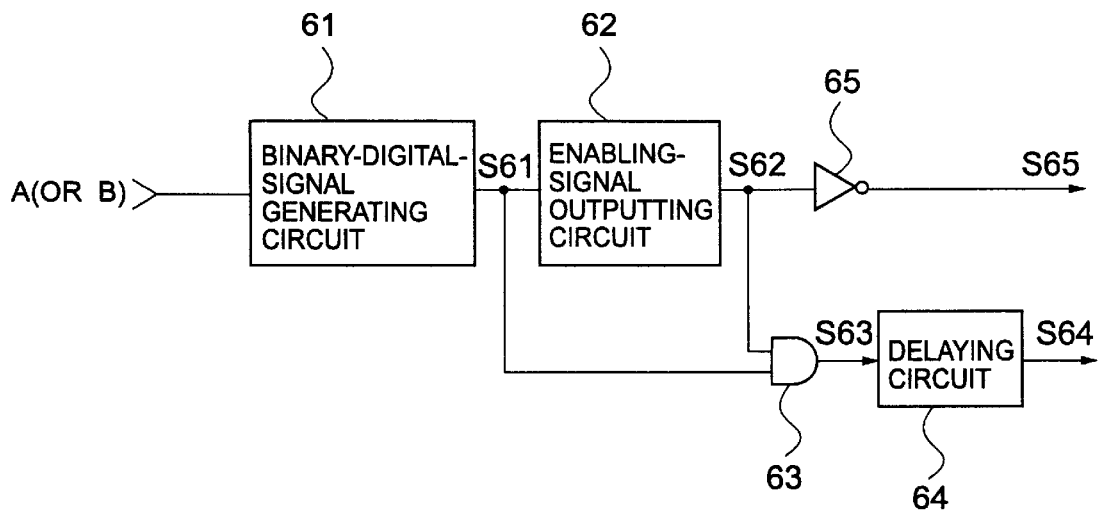
FIG. 14 shows a functional block diagram of an example of an arrangement of the gate portion used in an optical disk device in a seventh embodiment of the present invention.

FIG. 14 shows a functional block diagram of an example of an arrangement of the gate portion used in an optical disk device in the seventh embodiment. The arrangement shown in FIG. 14 includes a binary-digital-signal generating circuit 61, an enabling-signal outputting circuit 62, a logical-product circuit 63, a delaying circuit 64, and an inverter 65. The signal A (or B), which is one of the output signals of the I/V amplifier 10 shown in FIG. 1, is input to the binary-digital-signal generating circuit 61. The binary-digital-signal generating circuit 61 outputs a binary digital signal S61. The enabling-signal outputting circuit 62 outputs a signal (enabling signal) S62. The logical-product circuit 63 outputs a logical-product signal S63. The delaying circuit 64 outputs a signal (register timing signal) S64. The inverter 65 outputs a signal (holding timing signal) S65.

The arrangements of the gate portion for processing the output signals A and B of the photodetector are basically the same. Therefore, FIG. 14 shows the gate circuit for one signal A (or B) of the two signals A and B, and indication and description for the gate circuit for the other signal will be omitted.

Figure 15:
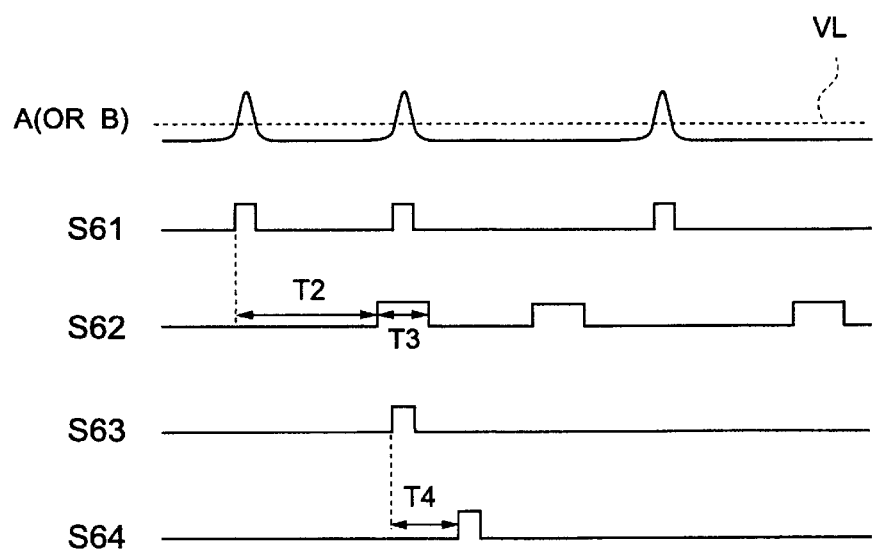
FIG. 15 shows a timing chart for describing the operation of the gate portion shown in FIG. 14.

The binary-digital-signal generating circuit 61 digitizes the output signal A (or B) of the photodetector into the binary digital signal S61 using a predetermined voltage level VL (as shown in FIG. 15) as a reference level.

The enabling-signal outputting circuit 62 causes the level of the enabling signal S62 to be high during a predetermined third time period T3 (as shown in FIG. 15). The predetermined third time period starts at a timing delayed for a predetermined second time period T2 from the timing of each rising edge of the output signal S61 of the binary-digital-signal generating circuit 61 (as shown in FIG. 15).

The logical-product circuit 63 outputs the logical product of the output signal S61 of the binary-digital-signal generating circuit 61 and the enabling signal S62 output from the enabling-signal outputting circuit 62.

The delay circuit 64 delays the output signal S63 of the logical-product circuit 63 for a fourth predetermined time period T4 (as shown in FIG. 15).

The gate portion in the seventh embodiment has the above-described arrangement.

An operation of the gate portion shown in FIG. 14 will now be described.

FIG. 15 shows a timing chart for describing the operation of the gate portion shown in FIG. 14. The names of the signals shown in FIG. 15 correspond to those shown in FIG. 14, respectively.

The enabling-signal outputting circuit 62 generates the enabling signal S62, as shown in FIG. 15. The enabling signal S62 rises after the predetermined second time period T2 has elapsed from each rising edge of the binary digital signal S61 output from the binary-digital-signal generating circuit 61. The enabling signal S62 then decays after the third predetermined time period T3 has elapsed since the enabling signal S62 rose.

This enabling-signal outputting circuit 62 may comprise a monostable multivibrator or the like, for example.

When the gate portion shown in FIG. 14 is used for the holding portion in the fifth embodiment described with reference to FIG. 10, the holding timing shown in FIG. 10 to be input to the peak holding circuit 42 corresponds to each part of the enabling signal S62, during which part of the enabling signal S62 the level of the enabling signal S62 is low. The peak holding circuit 42 samples the value of the input signal during the time period during which the level of the enabling signal S62 is high, and the peak holding circuit 42 holds the sampled value of the input signal during the time period during which the level of the enabling signal S62 is low.

Thereby, in a case where the interval between the successive pre-pits is predetermined, it is possible to open the sampling gate at the appropriate timing.

Further, the logical-product output S63 of this enabling signal S62 and the output signal S61 of the binary-digital-signal generating circuit 61 is generated by the logical-product circuit 63. Then, the logical-product output signal S63 is delayed for the fourth predetermined time period T4 by the delaying circuit 64. Thus, the output signal S64, shown in FIG. 15, is obtained.

When the gate portion shown in FIG. 14 is used for the holding portion in the fifth embodiment described with reference to FIG. 10, the register timing shown in FIG. 10 to be input to the register 44 corresponds to each part of the signal S64, the level of the signal S64 being high during the part of the signal S64.

Thus, the peak holding circuit 42 samples each local maximum value of the input signal A (or B) during the time period during which the level of the enabling signal S62 is high, and the peak holding circuit 42 holds the sampled value during the time period during which the level of the enabling signal S62 is low.

Then, before the value held in the peak holding circuit 42 changes due to discharge in the capacitor of the peak holding circuit 42, the register 44 stores this value at the register timing which is the timing at which the level of the register timing signal S64 is high.

In this case, the second predetermined time T2 is on the order of the interval between the successive pre-pits. The third predetermined time T3 is a little longer than the time period corresponding to the length of each pre-pit, and is such that the maximum value of each pre-pit signal can be accurately held by the peak holding portion 42. The fourth predetermined time T4 is such that the register 44 can store the value held by the peak holding circuit 42 at the timing after the sampled maximum value of each pre-pit signal becomes fixed and before a change in the sampled maximum value of the pre-pit signal occurs due to discharge in the capacitor of the peak holding circuit 42 and thus an error occurs.

Thus, in the seventh embodiment, when the timing signal for holding the maximum value of each pre-pit signal is generated, the output signal A (or B) of the photodetector is digitized into the binary digital signal (S61) by using the predetermined voltage level (VL), the enabling signal (S62) of the third predetermined time period (T3) is output after the second predetermined time period (T2) has elapsed from each rising edge of the binary digital signal (S61), the logical product (S63) of the binary digital signal (S61) and the enabling signal (S62) is output, and the logical-product output (S63) is delayed for the fourth predetermined time period (T4).

Thereby, for the pre-pit(s) of the successively arranged plurality of pre-pits, the interval between each pair of successive pre-pits of the plurality of pre-pits being predetermined, even through timings of occurrences (detection) of the plurality of pre-pits cannot be predicted, it is possible to generate the accurate timing signal.

Further, the present invention is not limited to the above-described embodiments, and variations and modifications may be made without departing from the scope of the present invention.

The contents of the basic Japanese Patent Application No.9-278256, filed on Sep. 25, 1997, are hereby incorporated by reference.

What is claimed is:

1. An optical disk device, which performs tracking on a recordable optical disk which has an information recording track and a guiding track for guiding an optical beam to the information recording track, the guiding track having pre-pits including address information recorded therein, said device comprising:

a photodetector which is divided into two divisions by a dividing line which is approximately optically parallel to the tangential line of the information recording track of the optical disk, and receives reflected light of the optical beam which is incident on the information recording track; and a tracking-error-signal generating portion having the respective outputs of said two divisions of said photodetector input thereto and generating a tracking error signal which is used for performing the tracking on the optical disk, wherein said tracking-error-signal generating portion comprises:

first and second holding portions holding local maximum values of the outputs of said two divisions of said photodetector, respectively; and a pre-pit-signal subtracting portion obtaining the differential signal of respective outputs of said first and second holding portions.

2. The optical disk device as claimed in claim 1, wherein said tracking-error-signal generating portion further comprises:

a gate portion updating respective values of said first and second holding portions at a predetermined time interval; and a pre-pit-differential-signal low-frequency-band passing portion causing a low-frequency-band component of an output of said pre-pit-signal subtracting portion to pass therethrough.

3. The optical disk device as claimed in claim 2, wherein said tracking-error-signal generating portion further comprises:

a push-pull-signal subtracting portion obtaining the differential signal of the respective outputs of said two divisions of said photodetector;

a push-pull-differential-signal low-frequency-band passing portion which causes a low-frequency-band component of an output of said push-pull-signal subtracting portion to pass therethrough; and a correcting portion correcting an output of said push-pull-differential-signal low-frequency-band passing portion using an output of said pre-pit-differential-signal low-frequency-band passing portion.

4. The optical disk device as claimed in claim 3, wherein said tracking-error-signal generating portion further comprises:

an offset adding portion adding a predetermined amount of offset to an output of said correcting portion; and a switching portion switching the predetermined amount of offset of said offset adding portion between an amount for a case where information is written in a not-yet-recorded area and an amount for a case where information is rewritten in an already-recorded area.

5. The optical disk device as claimed in claim 2, wherein said gate portion comprises:

a binary-digital-signal generating portion digitizing respective outputs of said two divisions of said photodetector into binary digital signals, using a predetermined level as a reference level; and a delaying portion delaying the output signals of said binary-digital-signal generating portion for a predetermined time period.

6. The optical disk device as claimed in claim 2, wherein said gate portion comprises:

a binary-digital-signal generating portion digitizing respective outputs of said two divisions of said photodetector into binary digital signals, using a predetermined level as a reference level;

a logical-product outputting portion outputting the logical products of recording data and the respective output signals of said binary-digital-signal generating portion; and a delaying portion delaying the respective outputs of said logical-product outputting portion for a predetermined time period.

7. The optical disk device as claimed in claim 2, wherein said gate portion comprises:

a binary-digital-signal generating portion digitizing each of the outputs of said two divisions of said photodetector into a binary digital signal, using a predetermined level as a reference level;

an enabling-signal outputting portion outputting an enabling signal which rises after a first predetermined time period has elapsed from each rising edge of the output of said binary-digital-signal generating portion, and decays after a second predetermined time period has elapsed since the enabling signal rose;

a logical-product outputting portion outputting logical products of the output of said binary-digital-signal generating portion and the output of said enabling-signal outputting portion; and a delaying portion delaying the output of said logical-product outputting portion for a third predetermined time period.

8. The optical disk device as claimed in claim 1, wherein each of said first and second holding portions comprises a peak holding circuit, an A-D converter, a register and a D-A converter.

9. An optical disk device, which performs tracking on a recordable optical disk which has an information recording track and a guiding track for guiding an optical beam to the information recording track, the guiding track having pre-pits including address information recorded therein, said device comprising:

a photodetector which is divided into two divisions by a dividing line which is approximately optically parallel to the tangential line of the information recording track of the optical disk, and receives reflected light of the optical beam which is incident on the information recording track; and a tracking-error-signal generating portion having the respective outputs of said two divisions of said photodetector input thereto and generating a tracking error signal which is used for performing the tracking on the optical disk, wherein said tracking-error-signal generating portion comprises:

a first subtracting portion obtaining the differential signal of respective outputs of said two divisions of said photodetector;

a first holding portion holding the absolute values of local maximum values of an output of said first subtracting portion;

a second holding portion holding the absolute values of local minimum values of the output of said first subtracting portion; and a second subtracting portion obtaining the differential signal of respective outputs of said first and second holding portions.

10. The optical disk device as claimed in claim 9, wherein said tracking-error-signal generating portion further comprises:

a gate portion updating respective values of said first and second holding portions at a predetermined time interval; and a pre-pit-differential-signal low-frequency-band passing portion causing a low-frequency-band component of an output of said second subtracting portion to pass therethrough.

11. The optical disk device as claimed in claim 10, wherein said tracking-error-signal generating portion further comprises:

a third subtracting portion obtaining the differential signal of the respective outputs of said two divisions of said photodetector;

a push-pull-differential-signal low-frequency-band passing portion which causes a low-frequency-band component of an output of said third subtracting portion to pass therethrough; and a correcting portion correcting an output of said push-pull-differential-signal low-frequency-band passing portion using an output of said pre-pit-differential-signal low-frequency-band passing portion.

12. The optical disk device as claimed in claim 11, wherein said tracking-error-signal generating portion further comprises:

an offset adding portion adding a predetermined amount of offset to an output of said correcting portion; and a switching portion switching the predetermined amount of offset of said offset adding portion between an amount for a case where information is written in a not-yet-recorded area and an amount for a case where information is rewritten in an already-recorded area.

13. The optical disk device as claimed in claim 10, wherein said gate portion comprises:

a binary-digital-signal generating portion digitizing respective outputs of said two divisions of said photo-detector into binary digital signals, using a predetermined level as a reference level; and a delaying portion delaying the output signals of said binary-digital-signal generating portion for a predetermined time period.

14. The optical disk device as claimed in claim 10, wherein said gate portion comprises:

a binary-digital-signal generating portion digitizing respective outputs of said two divisions of said photo-detector into binary digital signals, using a predetermined level as a reference level;

a logical-product outputting portion outputting the logical products of recording data and the respective output signals of said binary-digital-signal generating portion; and a delaying portion delaying the respective outputs of said logical-product outputting portion for a predetermined time period.

15. The optical disk device as claimed in claim 10, wherein said gate portion comprises:

a binary-digital-signal generating portion digitizing each of the outputs of said two divisions of said photodetector into a binary digital signal, using a predetermined level as a reference level;

an enabling-signal outputting portion outputting an enabling signal which rises after a first predetermined time period has elapsed from each rising edge of the output of said binary-digital-signal generating portion, and decays after a second predetermined time period has elapsed since the enabling signal rose;

a logical-product outputting portion outputting logical products of the output of said binary-digital-signal generating portion and the output of said enabling-signal outputting portion; and a delaying portion delaying the output of said logical-product outputting portion for a third predetermined time period.

16. The optical disk device as claimed in claim 9, wherein each of said first and second holding portions comprises a peak holding circuit, an A-D converter, a register and a D-A converter.

* * * * *